(12) United States Patent
Schaper et al.

(10) Patent No.: US 7,692,409 B2
(45) Date of Patent: Apr. 6, 2010

(54) GENERATOR CONTROLLER

(75) Inventors: Scott R. Schaper, Seattle, WA (US);
Richard L. Proctor, Seattle, WA (US);
Donald P. Aupperle, Seattle, WA (US)

(73) Assignee: Acutra, Inc., Seattle, WA (US)

( * ) Notice: Subject to any disclaimer, the term of this patent is extended or adjusted under 35 U.S.C. 154(b) by 59 days.

(21) Appl. No.: 11/624,914

(22) Filed: Jan. 19, 2007

(65) Prior Publication Data

US 2009/0096426 A1 Apr. 16, 2009

Related U.S. Application Data

(63) Continuation of application No. 10/788,814, filed on Feb. 27, 2004, now Pat. No. 7,353,084.

(60) Provisional application No. 60/449,927, filed on Feb. 27, 2003.

(51) Int. Cl.
*H02J 7/04* (2006.01)

(52) U.S. Cl. .................. 320/157; 320/132; 320/133; 324/427

(58) Field of Classification Search ........... 320/137, 320/133, 132, 156, 157; 324/427
See application file for complete search history.

(56) References Cited

U.S. PATENT DOCUMENTS

| | | | |
|---|---|---|---|
| 1,507,300 A | 9/1924 | Replogle | |
| 4,788,487 A | 11/1988 | Picklesimer | |
| 5,204,814 A | 4/1993 | Noonan et al. | |
| 5,280,223 A | 1/1994 | Grabowski et al. | |
| 5,353,315 A | 10/1994 | Scarola et al. | |
| 5,412,251 A | 5/1995 | Furutani et al. | |
| 5,563,802 A | 10/1996 | Plahn et al. | |
| 5,712,052 A | 1/1998 | Kawatsu | |
| 5,771,475 A | 6/1998 | Tabata et al. | |
| 5,823,281 A | 10/1998 | Yamaguchi et al. | |
| 5,897,766 A | 4/1999 | Kawatsu | |
| 6,172,428 B1 | 1/2001 | Jordan | |
| 6,208,040 B1 | 3/2001 | Mardirossian | |
| 6,229,285 B1 * | 5/2001 | Ding | 320/132 |
| 6,724,100 B1 | 4/2004 | Gabriel | |
| 6,964,821 B2 | 11/2005 | Hirakata | |

FOREIGN PATENT DOCUMENTS

WO 0195417 12/2001

* cited by examiner

*Primary Examiner*—Patrick J Assouad
*Assistant Examiner*—Aaron Piggush
(74) *Attorney, Agent, or Firm*—Black Lowe & Graham, PLLC

(57) ABSTRACT

A generator controller, in its various embodiments, displays genset fault messages, a genset elapsed time hour meter, service countdown reminder, monitors battery voltage changes over multiple periods of time to establish and display the "battery level," uses the "battery level" to automatically start and stop the genset, and accepts multiple run requests from AC loads such as HVAC systems, and incorporates safety or other start inhibit features.

11 Claims, 9 Drawing Sheets

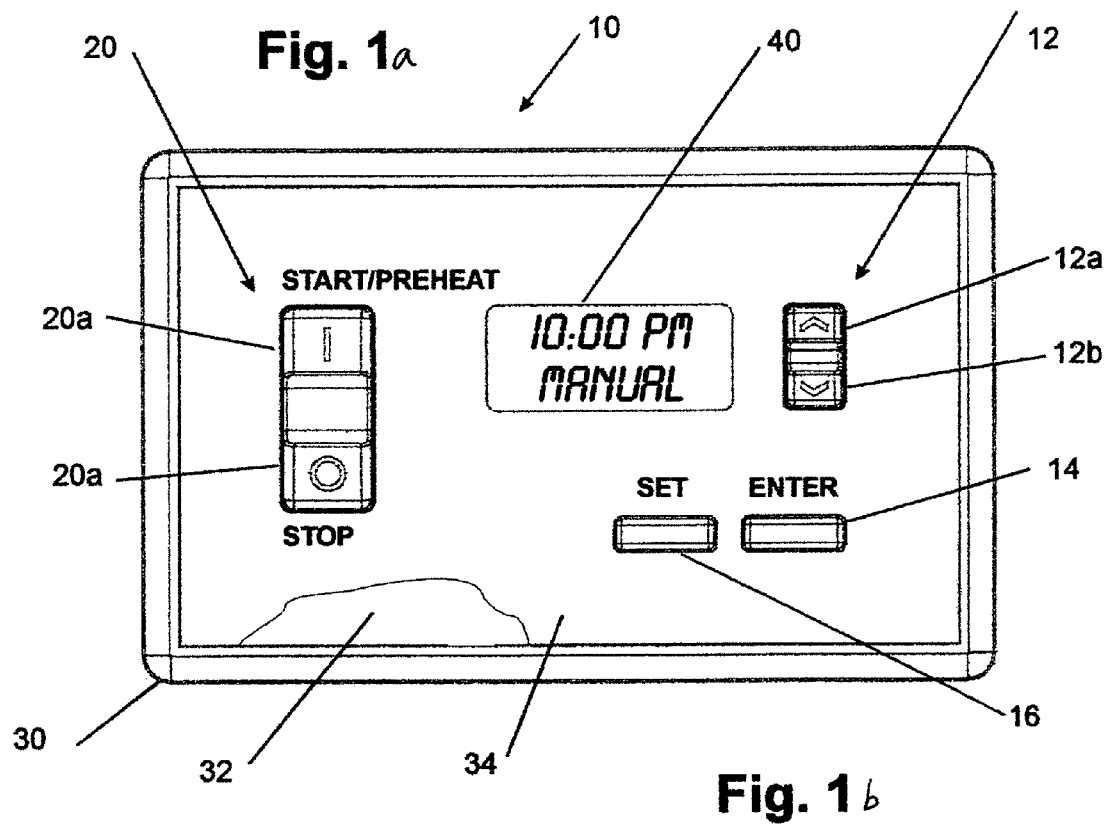
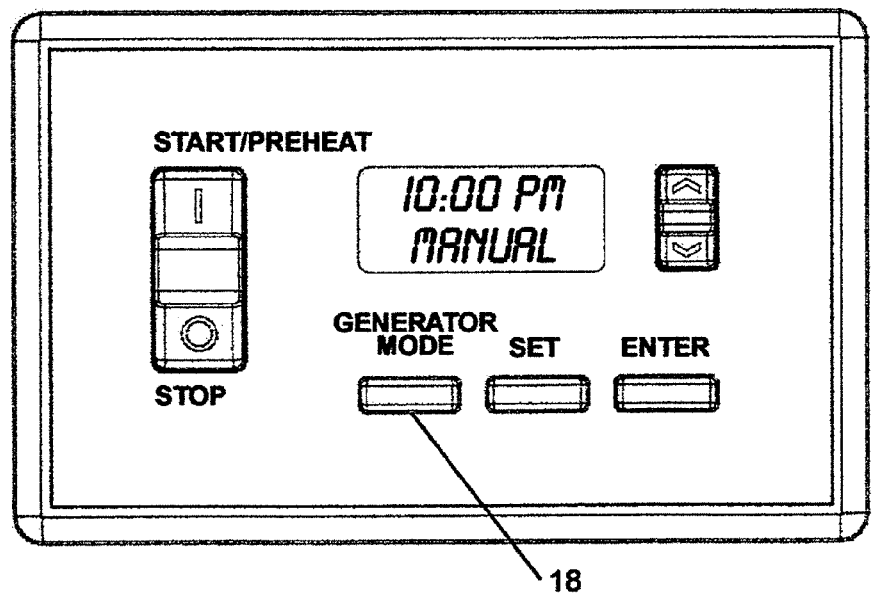

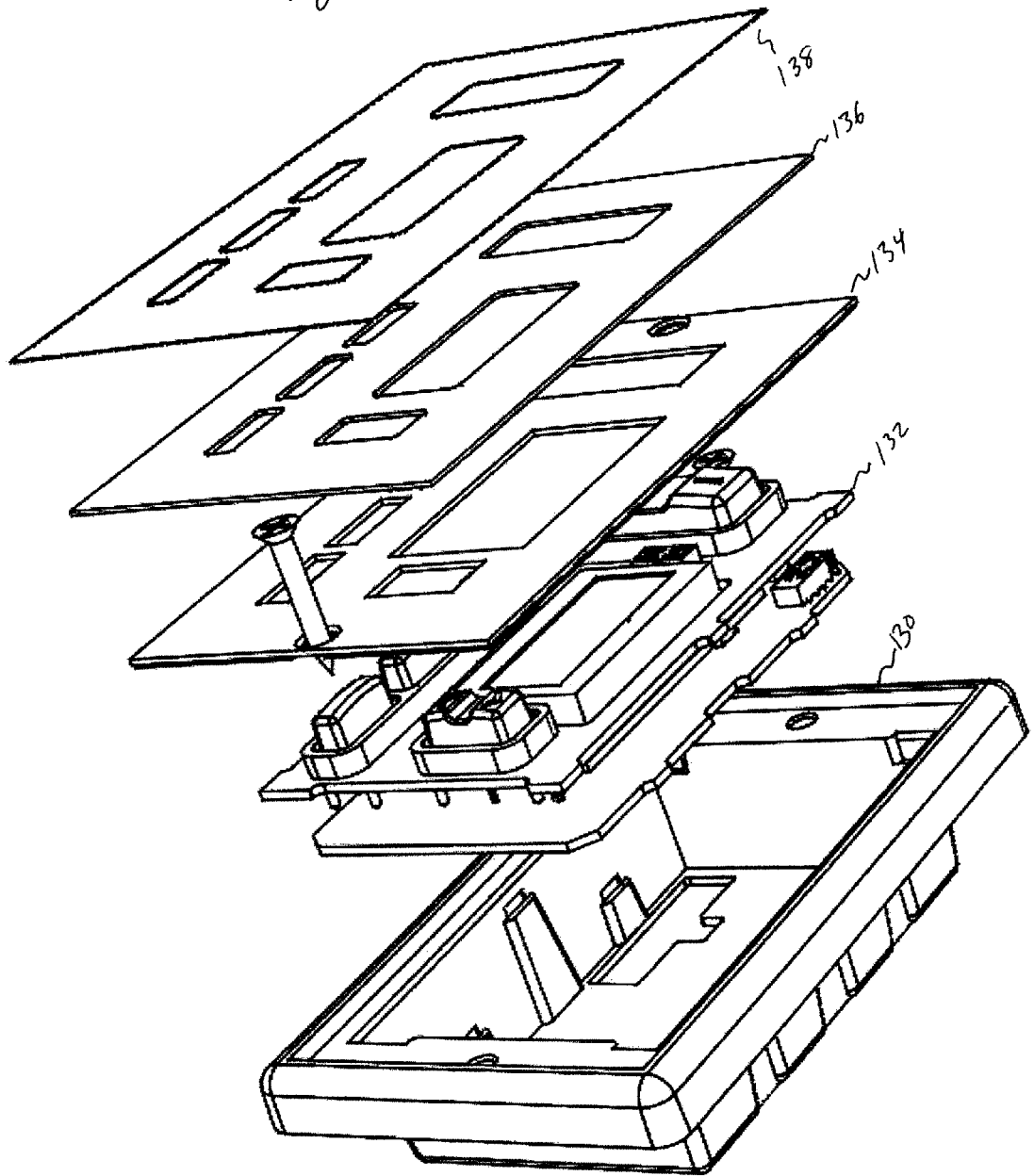

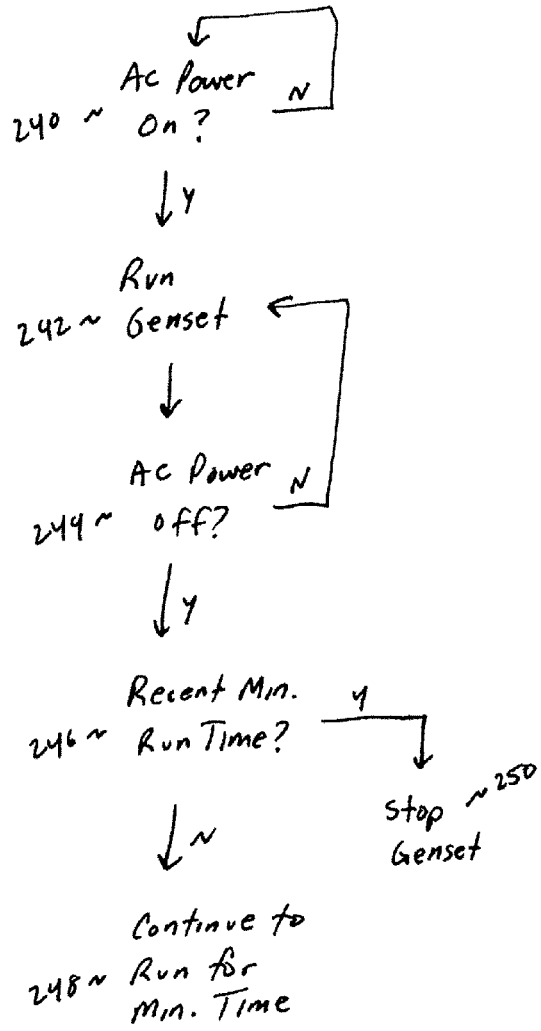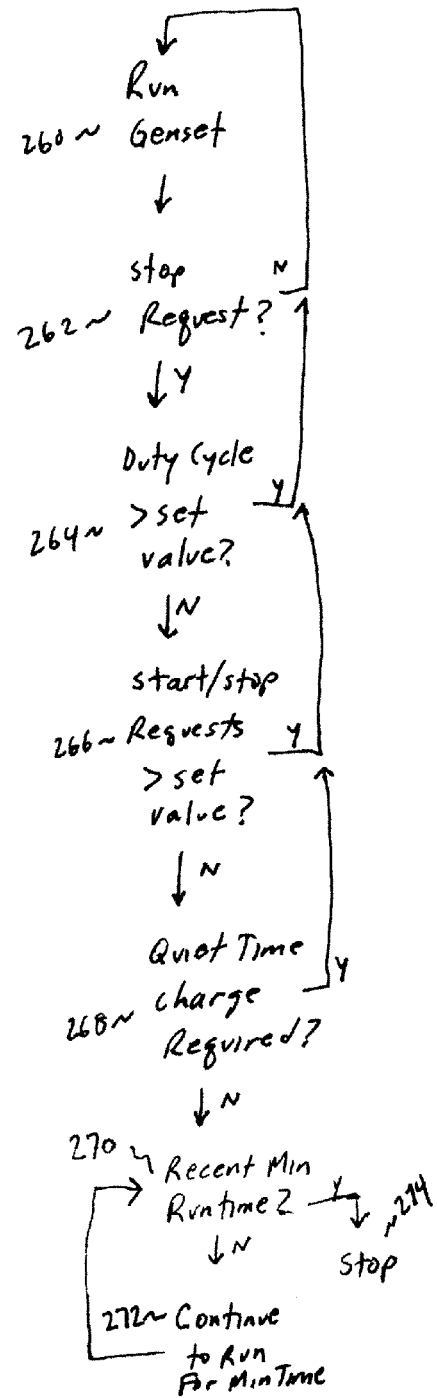

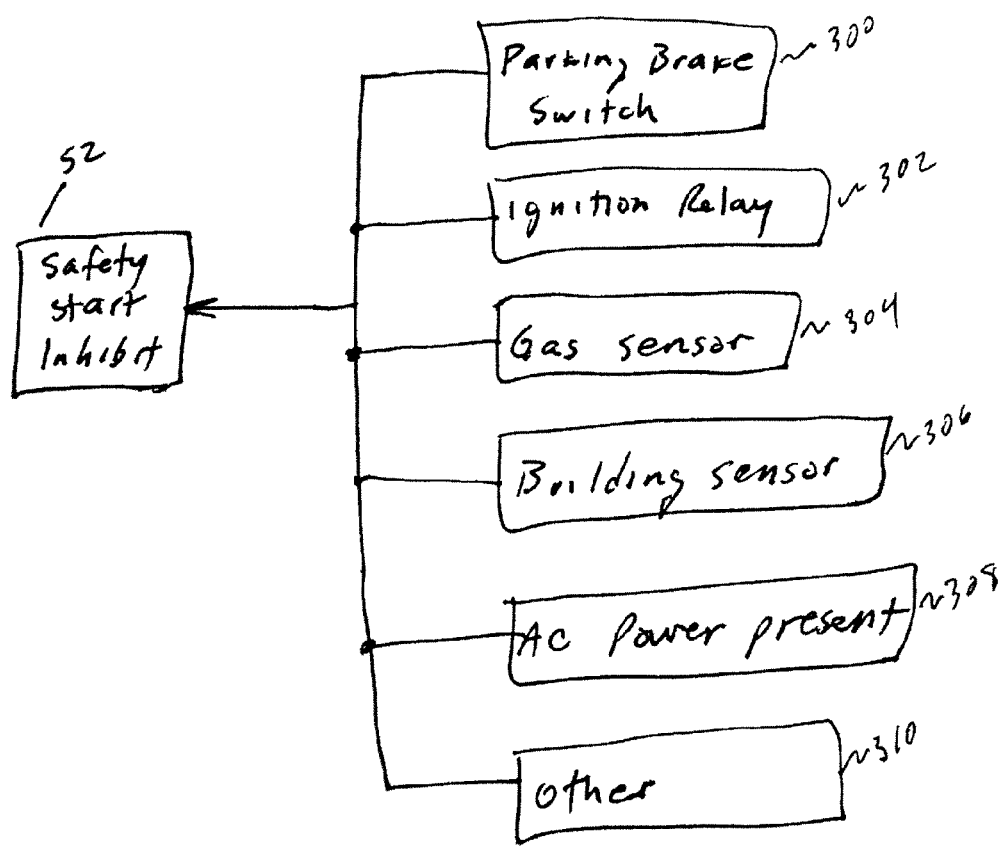

GENERATOR CONTROLLER

PRIORITY CLAIM

This application is a continuation of U.S. application Ser. No. 10/788,814, filed Feb. 27, 2004 now U.S. Pat. No. 7,353,084, which claims the benefit of provisional application Ser. No. 60/449,927, filed Feb. 27, 2003.

FIELD OF THE INVENTION

This invention relates to methods and apparatus for monitoring and adaptively controlling the starting and stopping of an engine driven power generator.

BACKGROUND OF THE INVENTION

This invention is primarily intended for use with power generators such as those used with Recreational Vehicles (RVs), including motor homes, coaches, campers, trailers, fifth-wheel trailers, and boats. It is not intended to be limited to those applications, and should be understood to be applicable to other arrangements in which power generators are used.

To understand the unique and valuable aspects of this invention it is useful to understand the typical power system found on Recreational Vehicles (RVs), boats, emergency vehicles, and stationary energy systems that incorporate engine driven diesel, gas, liquefied petroleum, or other generators. These systems frequently have intermittent AC power needs and multiple sources of power available. Often the critical systems are supplied by a DC battery system and the non-critical loads are supplied by the AC system.

RVs for example have both a 12V DC house or domestic system and a 120V AC system. The DC system commonly provides power for area lighting, stereo, water pumping, and other loads requiring relatively small amounts of power. The 120V AC system powers larger loads such as the microwave ovens, hot water heaters, heating and air conditioning (HVAC), and convenience outlets that supply power to loads such as entertainment systems. The domestic refrigerator is commonly supplied by both the 12V DC system and the 120V AC system, and sometimes alternatively by propane. Some systems also include a 12V DC to 120V AC inverter. Often the RV (or boat or other power user) is able to operate with only the DC system but the AC system provides additional comfort and features.

RVs and boats have similar systems and both typically have a power inlet for park power or shore power, as these industries refer to the AC utility power grid. These power inlets are commonly either 30 A 120V single phase AC or 50 A 120/240V single phase AC. Thus there are frequently two or three AC power sources available. Power transfer relays are commonly configured so that the priority of the power sources is:

Utility or Shore Power
Genset (generator)
Inverter

Typically the inverter only supplies AC devices that are the highest priority, such as the microwave, entertainment, and convenience outlets. It is not practical to run loads like hot water heaters and HVAC systems from inverters that are ultimately powered from batteries. Frequently the total AC power requirement of all of the system loads exceeds the park/shore power inlet, and consequently requires running the genset to power the entire system.

The operators of RVs must constantly monitor these various systems and make decisions about which power source to use and when. This results in less than optimal operating efficiency and great inconvenience. For example consider the RV camping situation in which there is no AC power. The DC system is used for lighting, refrigeration, and other applications. Perhaps there is also an inverter. Eventually the battery will become discharged under such constant use. The operator must monitor the battery and decide when to start the generator to recharge the battery and then continue to monitor it until it is charged and then stop the generator. Loads like HVAC systems which have intermittent on/off duty cycles require the operator to choose either to let the generator to run continuously or to repeatedly manually stop and start the genset.

Current systems for monitoring and controlling generators are generally lacking. In U.S. Pat. No. 1,507,300 Replogle teaches starting and stopping an internal combustion engine-driven generator based on battery voltage. Today there are a number of commercially available systems that will initiate starting and stopping the generator based on fixed voltage points. But the use of a single voltage point for starting and stopping requires considerable compromise because the state-of-charge of the battery is difficult to assess from the instantaneous voltage. Additionally many of the commercially available systems impose fixed minimum run times which can lead to excessive genset running.

The general notion of starting and stopping the genset based on demand from HVAC systems is taught by Picklesimer in U.S. Pat. No. 4,788,487. The Picklesimer system controls both starting and stopping of the genset and includes transfer relays for sequentially loading the genset after a fixed time delay from starting the genset. A fixed time is also imposed after the HVAC demand has been satisfied for genset cool down. As Picklesimer explains, " . . . the invention will permit continued repetition of the start up and shut down procedures as described to permit the interior of the motor home to be held to a narrow thermostat temperature range setting . . . " Though seemingly better then previous systems, the resultant "short-cycling" of repeated starting and stopping the genset causes excessive wear on the engine starting system. If the on demand time is relatively high it is actually better for the genset to run continuously.

Commercially available automatic starting systems suffer from the shortcomings described above as well as a lack of sufficient inputs and outputs to allow comprehensive control of the RV power system. The manufacturers of inverters have incorporated automatically starting and stopping the genset as part of the inverter system. It typically requires the purchase of a specific expensive model of inverter as well the optional monitoring panel (for example, a Trace RV series with RC-7G). Even so it does not include servicing run requests from HVAC systems. Some stand alone generator starting systems (for example, Heart AGS) have attempted to integrate automatic genset starting using both HVAC run requests and battery voltage. By imposing a minimum run time of 2 hours the unit effectively causes continuous genset running. Additionally none of the existing units interface well to the genset. No genset fault or error messages are displayed, the genset battery is not monitored, and typically the genset cannot even be conveniently started and stopped manually from the user interface.

The user interface supplied by most genset manufactures is very simple. Onan a Cummins Inc, subsidiary, has a remote that consists of an ON-OFF-ON rocker switch with a backlight and an hour meter or an analog volt meter. The backlight in the rocker switch is use to annunciate genset faults. Two levels of faults exist. For the first level the light is flashed about once per second if the engine temperature is high, it will flash about twice per second if the oil pressure is low, and if the light flashes about three times per second the user may hold the stop switch down for one to five seconds to access a second level of diagnostics. The light flash sequence now contains two digits corresponding to an error message. For example if the fault code were 38 there would be a sequence of three flashes followed by eight more that would lead the user to a table of error codes for the message: Over current low power factor loads, reduce load. Users are likely to be confused and unsuccessful when decoding this type of information. Additionally genset faults are only annunciated for five minutes, which means the user could have a fault but not know it. When the system is automated this is an issue as more elements are involved in the start/stop process.

Safety should be prime concern when automating the starting and stopping of the genset in a RV. Many RV owners have garages, buildings, or sheds where they park their RV. If there is a possibility of carbon-monoxide poisoning or suffocation from exhaust gasses automatic genset starting should be prohibited. Systems that are currently available have not adequately addressed the safety problems. The Heart AGS for example, recommends turning it off when the coach is in motion. This means it cannot be used in the automatic mode while traveling, even though this would be desirable for most motor homes.

The integration of genset user interface, system monitoring, and automatic control has substantially lagged monitoring and control systems of inverters. Inverter manufactures have also generally failed to integrate genset monitoring and control. Presently the typical RV may have a monitoring and control panel for the inverter, for the genset starting system, and for manual control and limited fault annunciation, perhaps with a mechanical hour meter or an analog voltmeter. The components of the system inappropriately overlap, have missing control features, tend to be costly, and nonintuitive. For the typical RV user the systems need to be simple to use with functionality appropriately divided.

Current systems reveal a lack of integration of key system elements, a lack of a user interface that is intuitive and informative, and a lack of safety features to protect users. They also rely on single point fixed times and voltage for control, potentially resulting in excessive running or excessive starts and stops. Thus there is a need for an improved system that addresses one or more of these shortcomings and advances the art with several significant new innovations.

SUMMARY OF THE INVENTION

The present invention, in its various preferred embodiments, provides methods and systems for a genset user interface and system monitor that displays genset fault messages, a genset elapsed time hour meter, service countdown reminder, monitors battery voltage changes over multiple periods of time to establish and display the "battery level," uses the "battery level" to automatically start and stop the genset, and accepts multiple run requests from AC loads such as HVAC systems, and incorporates safety or other start inhibit features.

A preferred embodiment includes a system to monitor genset flashing fault or status light output and display its equivalent message in English (or other language) in a user display.

In accordance with another preferred embodiment, the system adaptively adjusts the stop/start duty cycle to optimize genset running without excessive run time or starts and stops.

An additional alternate preferred embodiment monitors the battery state-of-charge and uses the resulting "battery level" to start and stop the genset, rather than relying on fixed voltages, which improves system performance.

In accordance with additional preferred embodiments, the invention inhibits the genset from starting if it is not in a safe environment.

Yet another alternate embodiment starts the genset if the inverter is overloaded, which enables the use of a smaller less costly inverter.

These and other alternate preferred features are described in greater detail below.

BRIEF DESCRIPTION OF THE DRAWINGS

The preferred and alternative embodiments of the present invention are described in detail below with reference to the following drawings.

FIG. 1a is a front plan view of a preferred generator controller;

FIG. 1b is a front plan view of an alternate preferred generator controller;

FIG. 4a is an exploded view of a preferred construction for a generator controller;

FIG. 7 is a flow diagram for a preferred management of a battery charging cycle;

FIG. 8 is a flow diagram for a preferred management of a battery charging cycle;

FIG. 10 is a block diagram for a plurality of start inhibit sources.

DETAILED DESCRIPTION OF THE PREFERRED EMBODIMENT

Figure 2:
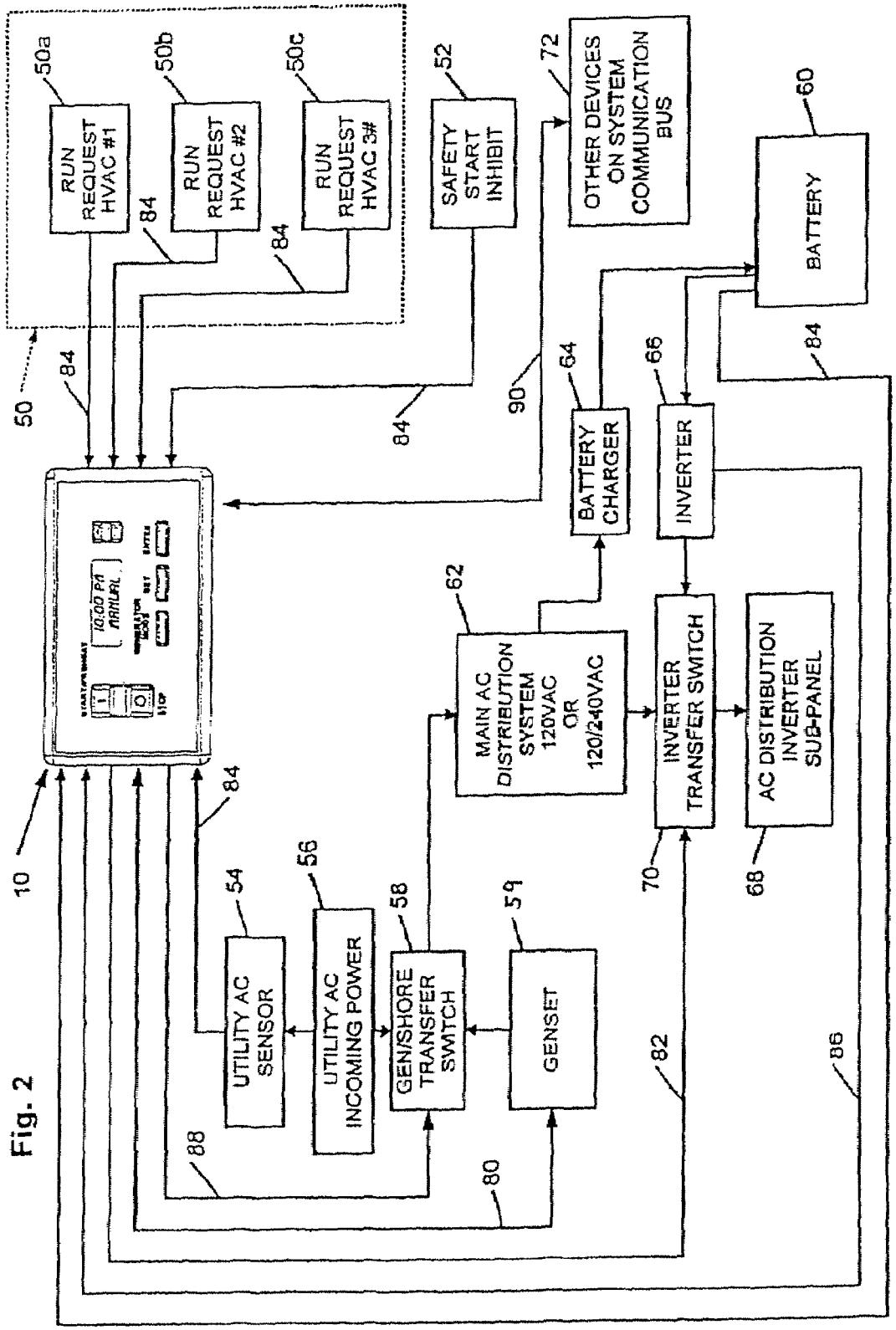
FIG. 2 is a block diagram of a preferred generator controller integrated with a generator and other components.

The generator controller has a host of innovative features that are variously incorporated into the different preferred embodiments of the invention. As such, a characterization that a feature is incorporated by the invention should only be taken to mean that one or more preferred embodiments adopts that feature.

In one form, the generator controller constantly monitors the 12V DC system and if the battery charge is low it automatically starts the generator and runs it until the battery is recharged. If a load such as an Air Conditioner requests power the generator automatically starts and services the Air Conditioner. It imposes a typical minimum run time of 30 minutes (or other adjustable duration) to avoid short cycling the generator. It is able to accept multiple start requests; for example, three are provided in one embodiment. It also has an AC power present signal that can be used to start and stop the generator, as appropriate, if utility or shore power is present.

The preferred embodiment also incorporates knowing when to stop or not run the generator. For example National and State parks, as well as many private parks, have quiet hours during which the running of a generator is prohibited. Respecting a quiet time is best accomplished if the control system knows the local time. The preferred embodiment has a real time clock with a battery backup so that the unit it will keep accurate local time even if the main 12V power supply is disconnected. The local time is displayed and is easily set. The start and end of the quiet hours is also easily set using the operator interface. These and other preferred features are discussed in greater detail below.

Generator Controller User Interface

FIGS. 1a and 1b provide a front view of a preferred generator controller 10, including the user interface. The controller 10 includes an up/down rocker key 12, including an up key portion 12a and a down key portion 12b. An enter key 14 and a set key 16 are provided, in addition to a start/stop rocker switch 20 having a start ("1") key portion 20a and a stop ("0") key portion 20b. Each of the keys can be implemented in a variety of ways, for example, the preferred keys are rubber keys with conductive pucks. Alternatively, dome switches, discreet switches, or other embodiments are also possible. Likewise, the positioning of the keys on the face of the controller is only one of many possible arrangements within the scope of this invention. The embodiment depicted in FIG. 1b includes an additional key, which is a generator mode key 18.

The controller 10 includes a display 40 that is capable of presenting messages, time, battery state of charge, warnings, modes, and other information to the user. In the preferred form, the display is an LCD display, although it could take the form of an LED or other display.

The controller 10 comprises an external housing 30 that is preferably formed from plastic. The housing retains internal components such as a printed circuit board (not visible in FIG. 1). A metal subpanel 32 is mounted adjacent the rim of the housing 30. A magnetic overlay 34 is magnetically attached to the subpanel 32, and includes printed information such as labels for the keys, a device model number, and an OEM label.

Generator Controller System Interface

The generator controller 10 interacts with a generator (genset), battery, AC power supplies, and other components that are typically installed in a boat, RV, or other structure that uses a generator, as depicted in FIG. 2. Any number of devices such as Heating Ventilation and Air Conditioning (HVAC) 50a-c may generate run requests and are coupled to the generator controller 10 via cables 84.

A safety start inhibit device 52 is also connected to the controller 10 via a cable 84. The safety start inhibit 52 is described in greater detail below, and is used to prevent operation of the generator in certain unsafe conditions.

Other devices 72 may also be present on a system communication bus 90 and in signal communication with the controller 10. The other devices 72 may take nearly any form, and could be, for example, a load manager, vehicle information system, or other devices in which integration into the system provides a benefit to the system and user.

A genset 59 is coupled to the controller 10 via a multiconductor signal cable. The bidirectional signal communication allows the controller to, for example, start and stop the genset 59, to receive messages from the genset, and to send responses or other control messages to the genset 59.

The genset 59 is also coupled to a main AC distribution system 62 via a gen/shore transfer switch 58. The gen/shore transfer switch selectively allows power to be provided either from the genset 59 or utility (shore) incoming AC power 58, which is also coupled to the gen/shore transfer switch. The utility incoming AC power 58 is the power provided at the shore or at, for example, an RV park from a land power line. The utility AC incoming power is also coupled to a utility AC sensor 54, which may take the form of a doorbell transformer or a transformer/rectifier to provide a DC signal to the controller 10 via a signal cable 84 to indicate that AC power is present from a utility AC power source 58. The controller is then able to direct the gen/shore transfer switch 58 to connect the utility AC incoming power 58 to the main AC distribution system 62, and to disconnect the genset 59 from the main AC distribution system 62. The controller 10 will also, if appropriate in view of short cycle or other operating considerations, direct the genset 59 to shut off.

The main AC distribution system 62 is connected to a battery charger 64, which is connected to a battery 60 in order to charge the battery by drawing power from the genset 59 or utility AC incoming power 56, as described above. The battery 60 is also coupled to the controller 10 via a signal cable 84 so that the controller can determine the current battery voltage and other battery parameters such as rate of charge or discharge.

The battery 59 is also connected to an inverter 66 in order to provide AC power when desired. The inverter is coupled to an inverter transfer switch 70, which is also connected to the main AC distribution system 62. The inverter transfer switch 70 selectively allows power to be supplied from the inverter 66 or the main AC distribution system 62 to an AC distribution inverter sub-panel 68. The inverter transfer switch 70 is connected to the controller 10 via a cable 82 so that the controller can direct the transfer switch to supply power from the desired source, as explained in greater detail below. The AC distribution inverter sub panel 68 comprises one or more power outlets or other connections to which electrical devices may be connected.

Generator Controller Hardware & Construction

Figure 3:
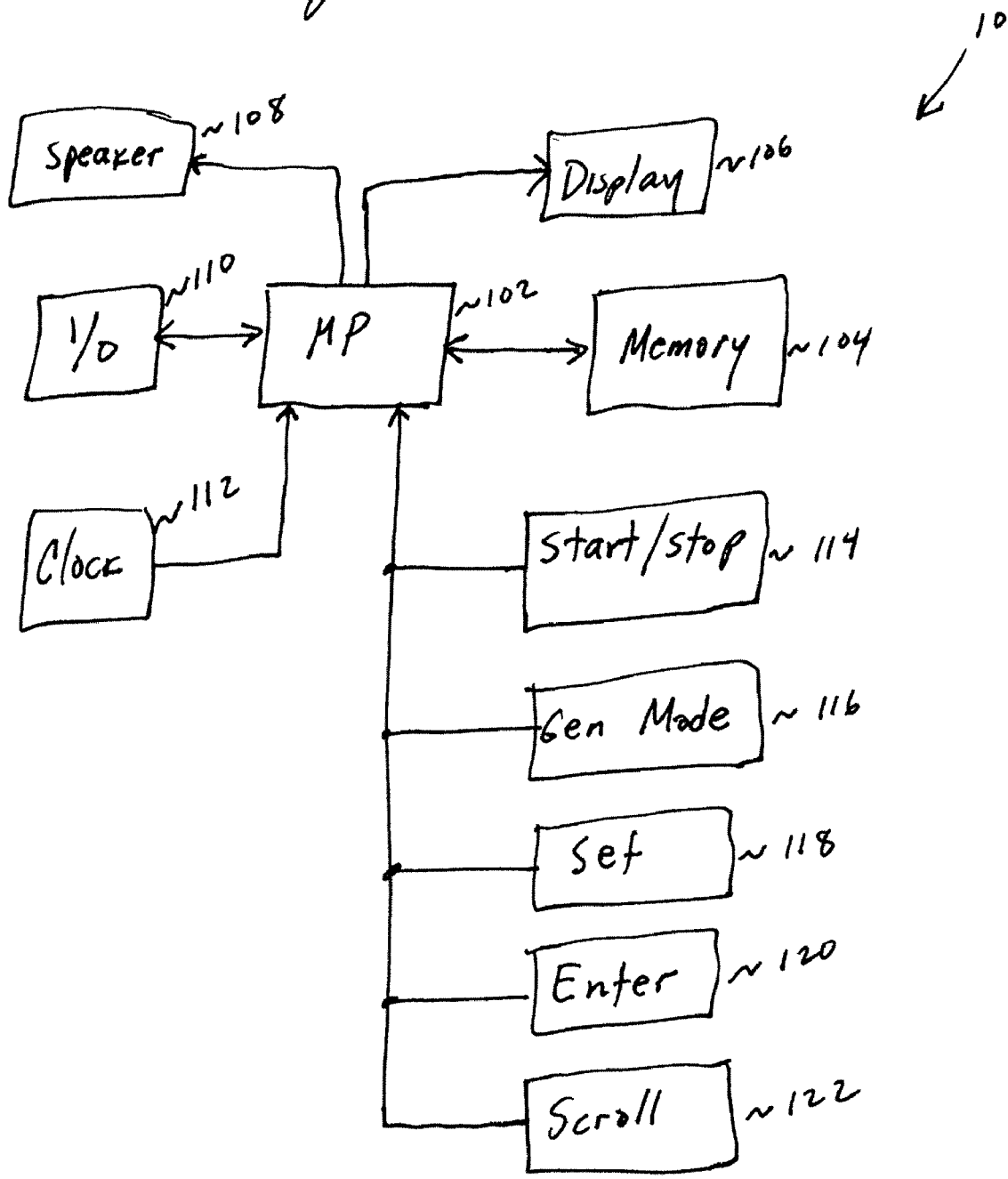
FIG. 3 is a block diagram of a preferred generator controller.

The internal components of the controller 10 are shown in the block diagram of FIG. 3. The controller includes a processor 102 and a memory 104. The memory may take any of a variety of forms, such as RAM, ROM, EPROM, EEPROM, optical devices, or any other structure capable of storing data and programming instructions. The memory 104 may also comprise a combination of different devices. The memory contains stored programming instructions that are operable by the processor 102 in order to perform the algorithms and processes described in this specification. It also stores data received from external sources or produced by the processor.

A display 106 is provided and is in signal communication with the processor and configured to display information obtained from the memory or other sources. As explained above with regard to FIG. 1, the display is preferably an LCD device.

A speaker 108 is also provided and in signal communication with the processor and adapted to produce audible sounds, preferably including sounds stored in the memory and retrieved under control of the processor. For example, the memory may contain stored alarm sounds corresponding to genset conditions or battery state of charge conditions so that the alarm can play those sounds when directed by the processor to do so.

An input/output jack 110 is provided and shown to be in signal communication with the processor 102. It should be understood, of course, that all of the various signal connections depicted in FIG. 3 may be via a communication bus. The input/output jack comprises electrical, optical, electromagnetic, or other connectors sufficient to enable signal communication between the controller 10 and external devices such as those illustrated in FIG. 2. In that regard, it should be understood that any cables described with reference to FIG. 2 may be replaced by other methods of signal communication, such as a serial data bus or an IR or RF wireless signal. One of the input sources that is preferably connected via the input/ output jack 110 is the battery 60 (see FIG. 2), which provides 12V power to the controller 10.

A clock 112 is provided and coupled to the processor 102. The clock is preferably a real-time clock that is also powered by a backup battery (not shown) so that real time is maintained even when the external battery 60 is disconnected.

Figure 4B:
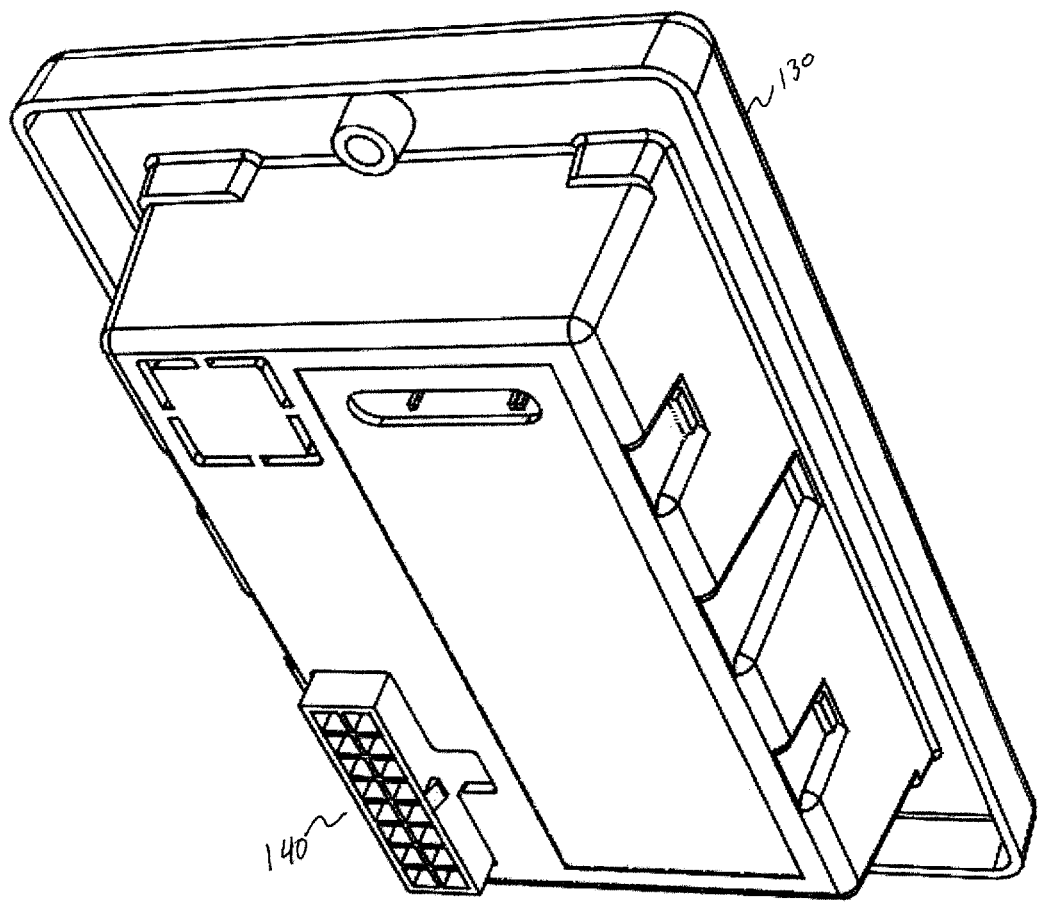
FIG. 4b is a bottom perspective view of a preferred generator controller.

The housing and construction of the generator controller is illustrated in FIGS. 4a and 4b. A housing 130 is formed from plastic or other materials suitable for packaging electronic devices. The housing preferably forms a shallow rectangular box, having a floor and four upright walls open at the top. One or more printed circuit boards 132 nests within the box adjacent the floor. It should be appreciated that the electronic components need not be configured on a printed circuit board, but rather may be constructed in alternate means. The printed circuit board 132 also supports the rocker switches and keys discussed above with regard to the user interface.

A metal plate 134 is secured over the open top of the housing, preferably using screws or other removable fasteners (although it may alternatively be snap-fit or otherwise attached). The plate 134 includes openings in appropriate positions so that the rocker switches and keys extend through the openings and seat snugly within the openings. The internal printed circuit boards are retained by snap fittings, but the plate 134 may alternatively the printed circuit board within the housing 130. In the preferred form, the plate is formed from a ferromagnetic material so that a magnetic sheet 136 having an attached label overlay 138 is removably attachable to the plate. Both the magnetic sheet 136 and the overlay 138 include cutouts and openings that match those of the plate 134 so that the rocker switches, keys, and display extend or are visible through the openings. The magnetic sheet and overlay allow for the manufacture of a common housing, circuit board, cover plate, and magnetic sheet along with a plurality of overlays that are tailored to specific customers or OEMs.

FIG. 4b provides a bottom perspective view of the housing 130, including the location and configuration of a preferred jack 140 with its various pin connections for inputs and outputs. The preferred input/output jack 140 is a standard Molex/Amp/Tyco plug which is simply plugged into a harness that is pre-wired in the vehicle.

Adaptive Cycle Management

The controller 10 uses an Adaptive Cycle Management system that anticipates the system power requirements. For example as the start of Quiet Time approaches the controller 10 checks the state of charge of the batteries and if needed will automatically start the generator to ensure the batteries enter Quiet Time fully charged. It is able to adapt the time at which it starts the generator based on the state of the battery.

Figure 5:
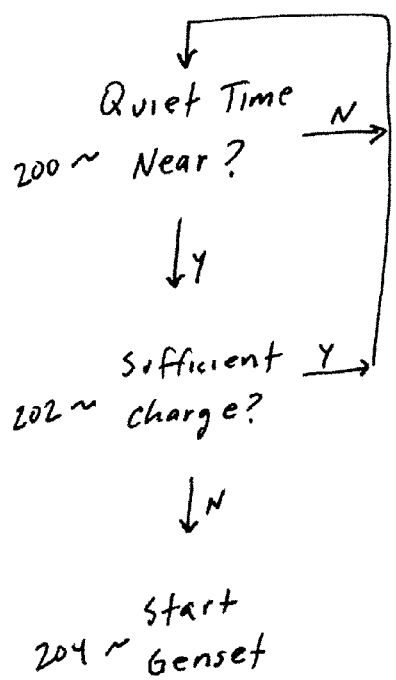
FIG. 5 is a flow diagram for a preferred management of a generator during a quiet time.

One presently preferred form for the adaptive cycle management process is depicted in FIG. 5. The controller memory includes stored programming instructions operable by the processor to implement the process. At a first block 200, the processor queries whether quiet time is approaching. The quiet time is user-definable and can vary as the user travels from one location to another. In order to determine whether quiet time is approaching, the processor compares the stored quiet time with the present real time as provided by the real time clock. Whether quite time is "approaching" is also user-settable and may, for example, be defined as a period of time within one hour of the defined beginning of quiet time.

If quiet time is approaching, the method proceeds to block 202, where it determines whether the current battery state of charge is sufficient to manage expected loads throughout the quiet time interval. In one form, the sufficiency evaluation compares state of charge data stored in the controller memory. The state of charge data can comprise present battery voltage, current rate of discharge or charge, and other aspects of battery usage. The expected load data may comprise a preset value for one or more of the above parameters, user-defined values, or stored history values for recent battery usage during the quite time period. By comparing the present state of charge with the expected load, the processor determines whether the state of charge is sufficient to handle the expected load. If the battery charge is not sufficient, the controller 10 starts the genset (or if it is already operating, ensures that it continues to operate).

Adaptive cycle management also actively balances excessive run time and short cycling. It compares the duty cycle of generator run time required to meet the start and run requests with the generator off time, and automatically adapts the run time to avoid short cycling or excessive running. Consider a typical day in the life of an RV that is camped in a summer time vacation spot with no AC grid power available. If the batteries are sized properly the domestic demand overnight will not have discharged them before morning. If they are low, as soon as quiet time ends the controller will automatically start the generator and run it for minimum of 30 minutes (or other adjustable duration). It will then assess the state-of-charge of the batteries and determine if additional running is required. If they are sufficiently charged to meet the morning demand the generator will be stopped rather than continue charging until the batteries are full. The controller anticipates more run time as the day progresses, during which there will be additional charge time for the batteries.

Figure 6:
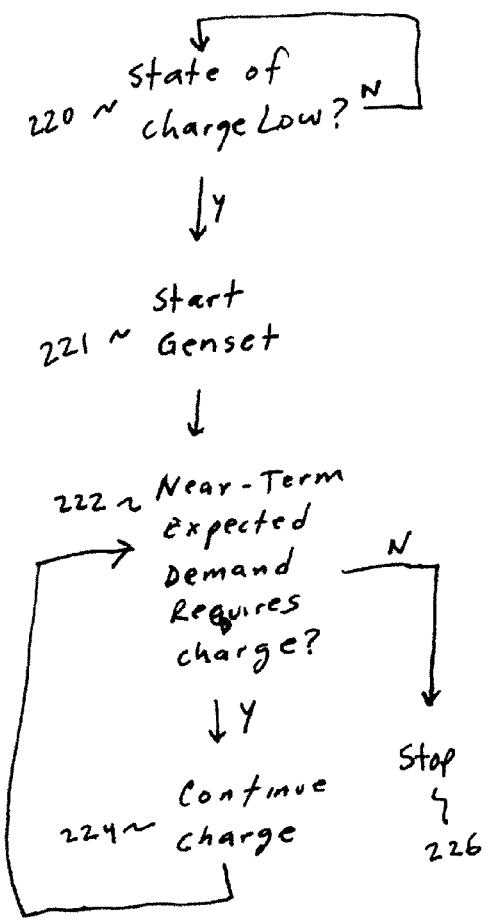
FIG. 6 is a flow diagram for a preferred management of a battery charging cycle.

A preferred process for implementing the short cycle management aspect of the controller is illustrated in FIG. 6. Again, the controller memory contains stored programming instructions operable by the processor to carry out the preferred processes. At a first block 220, the controller evaluates whether the present state of charge is too low. This initial inquiry may be in the form of a comparison of the state of charge with a preset value such that the controller will presumptively start the generator, block 221, if the state of charge is too low. In order to avoid short cycling, the generator will run for a minimum time, preferably 30 minutes or other adjustable duration.

At the end of the minimum run time, the process advances to block 222 to determine whether the near term expected demand will be met in view of the present state of charge. The near term demand may be a user-defined load level for a particular time of day, or may be based on stored historic usage levels for near-term portions of a day such as morning, afternoon, and evening. If the battery is sufficiently charged after the initial minimum run time, the controller causes the generator to stop; if a greater charge is required, the controller causes the generator to continue to operate, block 224. The continued operation time may be either a fixed additional time period or a variable one. In a variable mode, the generator continues to operate while the process continually compares state of charge with expected demand levels. Once the state of charge exceeds expected demand, the controller causes the generator to stop, block 226.

As the day warms the air conditioner (AC) begins to request power, the generator will automatically start. Initially it may only take a few minutes to cool the interior; the controller will stop if the previous minimum run time had occurred recently enough that the generator was still warm. If not it would run for the adjustable minimum run time of 30 minutes or other period as set by the user. This avoids excessive running by allowing the generator to be run for less than its minimum run time if it is already warm. Perhaps the generator will only have to run for a few minutes to bring satisfy the AC demand early in the day.

A preferred process for implementing this cycle management feature is depicted in FIG. 7. At a first block 240, the controller determines whether the AC power is on. This determination may be, for example, in the form of a run request signal from the HVAC to the controller (see FIG. 1). If the AC power is switched off, the controller causes the generator to run if not already running, block 242. The generator continues to run while the AC is on.

Once the AC is switched off, the process determines whether the generator had recently been operating for a minimum run time (e.g., 30 minutes or other specified time), block 246. Thus, for example, if the generator had completed a minimum 30 minute run time within the previous five minutes, there would be no need to continue to operate the generator to avoid short cycle concerns and the controller causes the generator to stop, block 250. This process allows the generator to be safely operated for less than the minimum run time under such conditions.

If a minimum run time had not been completed within a recent defined period, the controller may optionally cause the generator to continue to run until the end of the minimum run time, block 248, to avoid short cycling of the generator.

The controller also manages the operation of the generator with regard to the duty cycle of the generator. The on/off duty cycle of the generator will continue to increase as the day continues to warm and the demand for AC increases. The controller monitors the change in the duty cycle and if the on time verses the off time passes a programmable limit the generator will continue to run in anticipation of the next start/run request from the air conditioner. The preferred default on/off duty cycle is approximately 70%. If the ratio of the start/run request time to the off time is greater than 0.7 the controller will cause the generator to continue to run. This avoids excessive starting and stopping of the generator. Additionally if the actual number of start and stop requests exceeds a programmable threshold the controller will run the generator continuously, again avoiding excessive cycling.

When evening comes and the temperatures begin to fall the controller Adaptive Cycle Management system will reverse its management style. When the duty cycle falls below the programmed value (70% default value) it will once again turn off the generator when it is not required and will allow an increase in the number of starts and stops allowed. This minimizes generator running hours.

In anticipation of quiet time the controller will run the generator to top off the batteries before quiet time starts. It uses preprogrammed algorithms and historical performance of the system to determine the optimum start and run times. By looking at such values as rate of change of voltage during discharging and charging, historical battery voltage averages, the current value of voltage, the estimated state-of-charge, and other variable and inputs that the system monitor, it adapts the run time to optimize generator run time. When quiet time starts the generator will be inhibited from starting until Quiet Time ends the following morning.

One preferred implementation of the duty cycle management process is depicted in FIG. 8. At a first block 260, the generator is in a running condition. At block 262, the controller receives a stop request, for example in the form of the air conditioning cycling off. Upon receipt of the stop request, the process proceeds to block 264 where it determines whether the duty cycle of the generator in the applicable period (for example, in the morning, afternoon, or other defined period) exceeds the stored value (for example, 70% or other adjustable level). If so, the generation continues to operate for an additional minimum duration.

If the duty cycle operation has not been exceeded, the process continues to block 266, where the number of start and stop requests in the applicable period (for example, morning, afternoon, or evening) exceed an adjustable value. If so, the controller causes the generator to continue to operate for an additional minimum duration.

If the number of start and stop requests are not excessive, the process proceeds to block 268 where it determines whether an anticipatory quiet time charge is required (as explained above with regard to battery state of charge and expected load levels). If no quiet time charge is required, the controller proceeds to block 270, where it determines whether the generator has been run for a minimum time recently. Because the controller continually monitors and stores the times during which the generator is being run, it is able to readily determine whether a minimum run time has been completed. If it has not been completed within an adjustable stored time, the process proceeds to block 272 where the processor causes the genset to continue to run for a minimum run time.

If a minimum run time has completed recently, the process continues to block 274, where the controller causes the generator to stop.

The above adaptive cycle management is superior to existing systems. The typical system has a fixed minimum run time that is normally greater than 30 minutes, and is commonly two hours. This is to ensure the batteries are full and certainly avoids excessive starting. But under many common conditions the generator would start in the morning due to a low battery or an AC request and then run for two hours regardless of the AC demand. This same typical system would continue to run the generator for another two hours if the voltage has not reached a threshold (13.5V for this typical system), without regard to expected demands. At the end of this run time the generator may only be providing a few amps of battery charging. At the end of one of these two hour cycles the generator would be shut off. But the next AC request will trigger the two hour cycle all over again. It is typical to have very little off time with this type of a system.

Determining Battery State

Aside from specific demands from HVAC systems, the controller causes the generator to operate in order to maintain battery charge levels. The controller uses the actual battery voltage as well as the rate of change of voltage (dV/dt) to assess the need to start or continue to run the generator. These values are obtained by reading and storing in memory the battery voltage at regular intervals, then evaluating the voltage levels over time. This ensures that the generator is not run for extended periods of time to maintain a battery that is not accepting charge. The adaptive cycle management system is able to compare historical charge data and infer how it is being charged. Keeping historical data such as: lowest battery voltage, average discharge voltage, time at key voltage thresholds, time since last charge, average and maximum charge time, and other data that can be derived from its inputs the controller adapts its estimate of the battery state of charge. This same data is used to determine the battery state-of-charge bar graph display.

Figure 9:
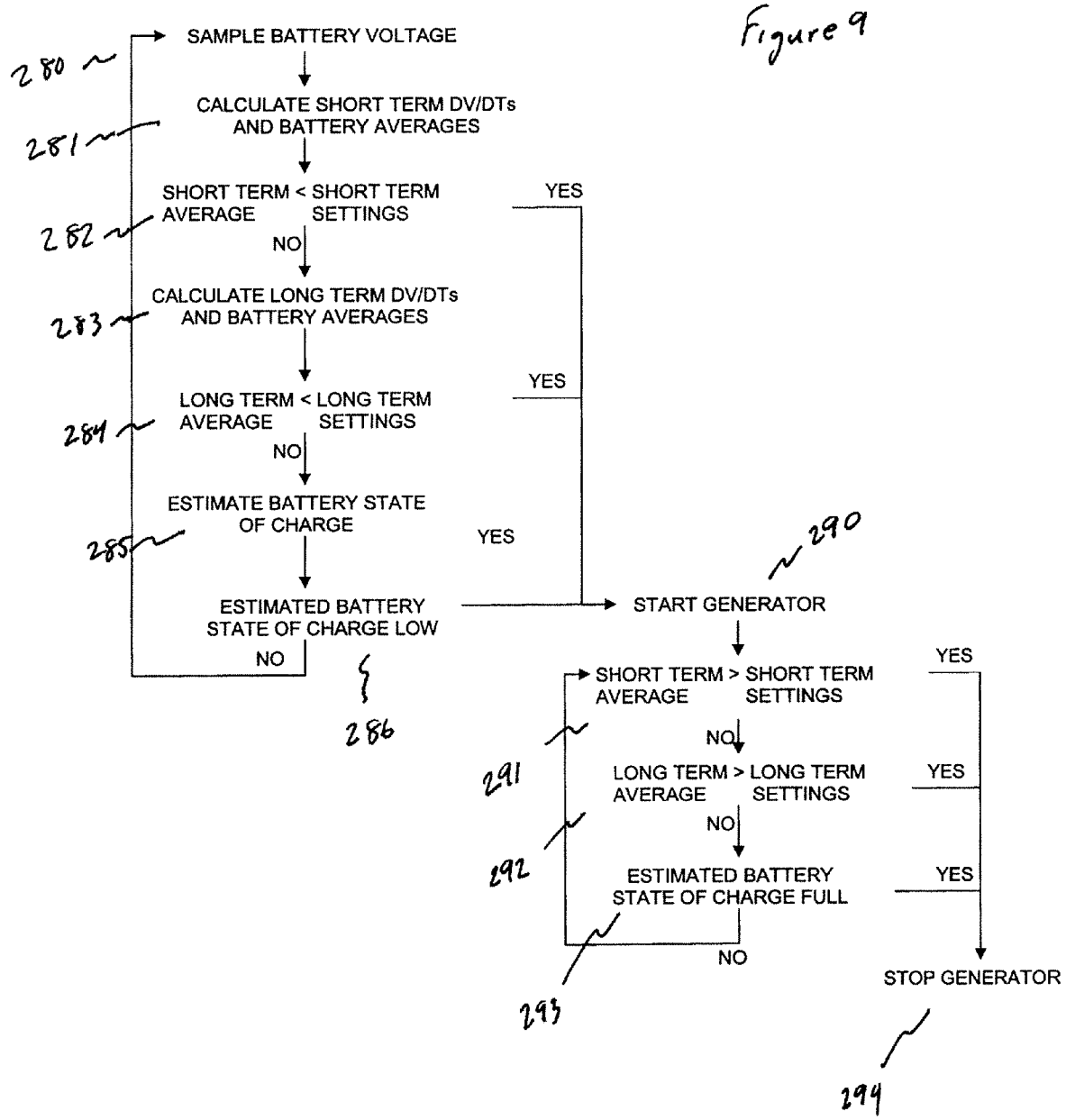
FIG. 9 is a flow diagram for a preferred management of a battery charging cycle incorporating battery state of charge information.

A preferred flow diagram for implementing adaptive cycle management using battery state of charge information is shown in FIG. 9. Initially, the battery voltage is sampled at block 280. Short term average battery voltages are calculated at block 281 and compared with stored settings for desired minimum voltage at block 282. If the short term voltage is less than a preset stored level, the battery is deemed to have too low a charge and the process proceeds to block 290, where the generator is started.

If the battery short term average is not below an adjustable value, the process proceeds to block 283, where the controller processor calculates long term changes in battery voltages over time, and averages of those values. At block 284, the long term average voltage is compared with adjustable stored settings for long term battery voltages. If the battery long term average battery voltage is below the stored value, the process proceeds to block 290, where the generator is started. If not, the process proceeds to block 285, where it estimates the present battery state of charge.

The battery state of charge preferably includes an evaluation of one or more parameters indicative of the state of charge of the battery. By continually monitoring and storing battery voltages over time, the processor is able to determine a variety of battery state of charge parameters. In one embodiment, the processor evaluates the lowest battery voltage, average discharge voltage, time at key voltage thresholds (which may be preset and adjustable), time since last charge, average and maximum charge time, and other data that can be derived from its inputs the controller adapts its estimate of the battery state of charge. The state of charge may be deemed to be too low if, for example, the time since last discharge is greater than a stored duration. If the evaluation of the state of charge indicates that the state of charge is too low, the process continues to block 290, where the generator is started. If not, the process continues back to block 280 to sample battery voltage.

Once the generator has started at block 290, the process performs similar battery state of charge monitoring to determine when to stop the generator. Initially, the process continues to block 291 where short term average voltages over time are compared with stored settings. Once the averages exceed the stored settings, the battery is deemed to be charged and the process proceeds to block 294 where the generator is stopped.

If the short term average voltages do not exceed the stored values, the process continues to block 292, where long term average voltages are compared with stored values. This step enables the processor to stop the generator if it is only providing a trickle charge over a long duration. If the long term average exceeds stored values, the process proceeds to block 294, where the generator is stopped. If not, the process continues to block 293 to evaluate one or more parameters related to battery state of charge. The parameters may include, for example, the parameters described above with regard to state of charge. If the evaluation of one or more such parameters indicates that the battery is fully charged, the process continues to block 294 where the generator is stopped. If not, the process continues to block 291 to monitor the battery charge.

Safety Start Inhibit

Safety is always a concern when integrating automation into a system. The preferred controller has a number of safety features that are unique and innovative. One safety concern is to not automatically start the engine when it is in a garage. The typical system today requires that power to it be disconnected when the vehicle's ignition switch is on or when the parking brake is released. Previously existing systems are disabled by turning them off. Unfortunately this means that the automatic mode cannot be used while underway, while driving down the road. The present preferred controller in contrast has a Safety Start Inhibit input that can receive its signal from a variety of sources. It can accept a signal from a parking brake switch or an ignition relay. When the controller sees a change the input signals it will change the mode to manual. If the operator wants to return it to the AUTO mode they may do so and enjoy the benefits.

One embodiment of the safety start inhibit feature is depicted in FIG. 2. In such an embodiment, one or more safety-related sources 52 is coupled to the controller 10 via an opto-coupled input. In an embodiment in which a plurality of safety start inhibit parameter is desired, a construction such as that of FIG. 10 may be used. Thus, output signals from a parking brake switch 300, ignition relay 302, gas sensor 304, building sensor 306, AC power present detector 308, or other device 310 are each in signal communication with a safety start inhibit adaptor 52. An active signal from any of the input sources causes a corresponding signal to be conveyed to the controller 10. The processor, in turn, causes the generator to stop operating or prevents the operation of the generator under conditions in which it would otherwise have operated until the safety start inhibit signal is no longer present.

As depicted in FIG. 2, the safety start inhibit 52 is depicted as a block external to the controller. Depending on the embodiment, however, the safety start inhibit may be nothing more than an input pin on the controller to enable it to be connected to the particular safety input source. Alternatively, it may include circuitry to receive and decode safety parameters to determine whether an input is unsafe. It may also comprise wireless receivers such as proximity detectors to determine the presence of a building or other object. In yet another embodiment, it may include a speaker capable of sounding an alarm under certain safety conditions, and circuitry sufficient to provide a signal to the controller to indicate the nature of the safety condition where multiple safety inputs are connected.

The safety start inhibit may accept an input from external sensors, such as sensors for Carbon Monoxide and Carbon Dioxide. These sensors are required in many installations but typically only sound an alarm. As explained above, in one embodiment, the controller can sound an alarm and inhibit the generator from starting. Likewise, each of the plurality of sensors may be incorporated into the generator controller itself, rather than being external devices in signal communication with the controller.

Additionally the Safety Start Inhibit can accept an input signal from a sensor system designed to signal or detect the presence of a building or garage in which the vehicle is parked. The configuration of such building detectors may consist of two categories, one in which the presence detector is located in the garage where the vehicle is normally parked. Sensors might include infrared, radar, ultrasound, RF or other wireless presence detectors readily available from the alarm and intrusion detection industry. The other category is where the detector is installed on the vehicle and designed to detect the presence of any building in which the vehicle is parked.

Optionally the stop input (reference number 20a in FIG. 1a) may be pulsed and the controller will switch to the manual mode. This allows any remote start switch for the generator to override the automatic starting function. This is a critical safety issue for the generator service technician. Pressing the local stop switch on at the generator ensures that the generator is under manual control. The controller is preferably supplied with a tag that is placed on the generator shroud or adjacent to the generator that informs the service technician that there is an automatic control system for the generator.

Though the foregoing discussion is primarily related to inhibiting the operation of the generator under specified safety conditions, it may also be adapted for more general environmental operating conditions in which it is preferred that the generator not operate. Such environmental conditions may include, for example, the presence of shore power.

Start Inhibit due to AC Present

The controller also solves another shortcoming of current generator starting systems that allow the generator to run when shore power is present. As depicted in FIG. 2, there is an input from a utility AC sensor 54 that tells the controller that AC from the shore or park is present. Programming stored in the memory and operated by the processor continually monitors for the presence of AC shore power as indicated by the AC sensor input 54. As long as the utility power is present, the controller provides a signal to the generator that causes the generator not to operate. This avoids the wasteful condition in which the generator is running while the loads are being supplied from shore power.

Decoding Generator Messages & Remote Control

The preferred controller also serves as a remote control for the generator, storing and displaying key generator data useful for technicians. Because the generator is started and stopped under control of the controller, the controller is able to track the number of hours the generator has run over its lifetime or over particular periods, storing this information in the memory. Likewise, the operation information may be displayed on the user interface display upon the request of a user. The memory also stores programmable service reminders that are automatically displayed, for example, when it is time to change the oil or perform other service functions.

Some generators, such as those produced by Onan, provide indicators in the form of a light that flashes if there is problem with low oil pressure, high temperature, or if service is required. The operator must count the rate of the flashes and then look at a table to determine the meaning of the error message. This is inconvenient and requires the operator to interpret the rate of flashing. In some cases, there are multiple levels that require the user to depress a button after seeing an initial flashing message in order to receive a more detailed message. The preferred controller decodes these signals and displays a text message to indicate the precise error message. If warranted, it can sound an audible alarm.

The memory of the controller includes stored displayable messages corresponding to the error signal received from the generator. Upon receipt of an error message, the processor retrieves the applicable message and displays it on the display, sounding an alarm or taking other action if associated programming instructions require it. In some instances, an additional inquiry to the generator is also required. For example, the generator may send an initial message corresponding to a "level 3" warning. The user may depress a button to then see an additional encoded number of flashes to decipher the particular level 3 concern. The stored data in the controller memory decodes the level 3 warning or other message, then sends a signal to the generator (if applicable) that corresponds to a user depressing the required button. This causes the generator to send to the controller the detailed message, which is processed in order to retrieve the applicable text from memory for display. In this fashion, the controller is able to remotely retrieve, decode, and display error messages from the generator.

The controller also takes care of the generator by preheating and priming it for the right amount of time, cranking only for the time recommended by the manufacturer, and waiting if it does not start, before trying again, for the amount of time required by the manufacturer. Each of these operating parameters is stored in the controller memory so that the controller causes the generator to operate in accordance with them. The controller also runs the generator for the minimum time desired; Onan for example, recommends that the generator be run for a minimum of 30 minutes. The controller imposes this adjustable minimum run time whenever it automatically starts the generator, unless over-ridden by other management variables as discussed above.

A Tool for Service Departments

The controller can be a valuable tool for service departments as well. If a generator such as the Onan Quiet Diesel remote flashes its indicator light at a rate of 3 that means that service is required. When the service department wants to find out more details it initiates a special diagnostic mode. In this mode the generator controller flashes the light in two multiple count sequences to indicate a number. For example it would flash the light twice then three times to indicate the number 23. The service technician would then look this number in a table and read the corresponding message for that number.

The preferred controller automatically decodes this and other diagnostic messages. The result is faster and more accurate service. Additionally key historical data about how the power system and the generator have performed is stored in non-volatile memory. Examples include: average run time, total run time, error message history, generator and domestic battery data, and any other relevant data which the controller processes.

Storage Mode

The controller may also be used in a "Storage Mode" which periodically starts the generator and runs it for a specific amount of time. Both the frequency and duration of run are adjustable. This is particularly valuable to the dealer or the owner who must store his vehicle or boat for extended periods of time. The Storage Mode ensures that the generator is regularly exercised and that all the batteries aboard stay charged. The Storage Mode is also invaluable for the Dealer, as it ensures that all systems will be in top condition whenever he shows the coach or boat.

Integration with Inverters

The controller also integrates DC/AC inverters into the power system in a unique way. Many RV's, boats, and other mobile vehicles with generators also have inverters incorporated into their systems. The inverter changes energy stored in batteries to alternating current similar to the power grid. These inverters are often sized to meet the demands of specific loads. In their simplest form they may plug into a cigarette lighter or have clamps to attach directly to the battery. In their most sophisticated form they can supply thousands of watts, incorporate battery charging, minimal load management, and even integrated generator starting based on battery state-of-charge.

The most common systems have inverters of 500 Watt to 2,000 Watts, which are frequently found on midsized RV's and boats. The typical use of inverters with about 500 Watts of capacity would be for entertainment and small appliances. The load which most commonly requires a larger inverter is a microwave. Inverters with a rating of 1,000 Watts or more are specified for such systems. As with all electronics the inverter's output rating depends on the temperature of the power components in the circuit. As inverters run heavy loads the temperature rises and their ability to maintain high output is reduced. Many inverters are able to carry substantial over current for several minutes. However they are often sized for continuous duty even though the battery system cannot sustain them for continuous running. Consider the 12V battery it would take to sustain a 2,500W inverter consuming between 200-250 A: It would require 3-4 times the current consumption in battery capacity—that is 600-800 Ahrs—and would weigh 400-600 pounds, and would only supply 1-2 hours of duty at such a high discharge rate.

When the preferred controller is integrated into the system the inverter and battery system can potentially be substantially smaller than is common practice today. As depicted in FIG. 2, the inverter 66 is in communication with the controller 10. Accordingly, the controller can optionally be programmed to start the generator with a start request from the inverter. In alternate forms, the controller may start and run the generator only when the inverter appears not to be able to handle the load, which may be based on the inverter's load current, an internally or externally generated start request signal, an overload signal, or other method of signaling the controller that the inverter is not able to run the load. These indicators are either present as depicted in FIG. 2, or may comprise additional system inputs 72.

This unique feature allows the use of smaller, lighter inverters and smaller battery systems. By using the controller to integrate the operation of the generator and the inverter they complement each other in a way that is unique from the current state-of-the-art, which depends solely on battery state-of-charge. Integrating and automating the operation allows more appropriately sized batteries and inverters. A system like this can easily meet the relatively low demands of entertainment or other loads, and sustain modest loads like small microwaves for a few minutes, but when the loads get too large, runs too long, or if the battery gets low, the generator automatically starts and takes over.

An analogous situation is one in which the shore power is inadequate to supply the AC load demands and may or may not be managed by a load or energy management system. For example, a RV that is designed with a 50 A input may be supplied by a 30 A shore power circuit. When a load or energy manager turns off loads to prevent tripping of the shore power breaker the controller can start the generator to satisfy AC load requirements. These run requests can include, but are not limited to, HVAC, Load or energy management systems, inadequate shore power available, and inverter overload. In such instances, the controller will detect that certain desired loads have been turned off, and will cause the generator to run (even though shore power is present) in order to allow those loads to continue to run.

The particular operation of preferred controller modes, programmable parameters, and preset values is further described below.

STOP/START Switches

The controller may be used to manually start and stop the generator by using the START/STOP rocker switch located on the left side of the display (see FIG. 1*a*). This switch functions exactly like the STOP/START switch located on the genset. There may also be other START/STOP switches at other locations (the dashboard in a Coach for example). When any STOP/START switch wired in the system is operated the generator mode is switched to manual. This is both a safety and convenience function. As a safety function it prevents automatic starting, when manually stopped for service. As a convenience function it prevents the generator from automatically stopping while using a specific load for which the genset has been started, for example a washing machine or power tool.

The START/STOP rocker switch has a red backlight which comes on when the generator is running. It is turned on by a +12V signal supplied by the genset. If the genset is equipped with diagnostics it also flashes to correspond to fault messages sent by the generator. The controller decodes the flashing fault message and displays an English fault message.

The generator may be started using the START/STOP switch even if there is no power to the controller. Once the generator is running the controller display will come on. The power is supplied from the generator.

Changing the GENERATOR MODE

The GENERATOR MODE key, on the left below the display in FIG. 1*b*, is used to change the operating mode of the generator. There are preferably three modes: MANUAL, QUIET ON, and AUTO ON. If the generator mode is not displayed, pressing the GENERATOR MODE key immediately exits to the default display (Local Time and Mode).

When in the MANUAL mode the genset may be started and stopped only by using the controller START/STOP, or other START/STOP switches wired in the system.

The QUIET ON mode enforces a user adjustable Quiet Time during which automatic genset starting is not permitted. This avoids late night automatic starts that may be annoying and break the quiet time regulations of campgrounds. Two hours prior to Quiet Time the battery state-of-charge is checked and if it is not full the genset is started to fill it before Quiet Time begins.

The AUTO ON mode will start the genset based on run requests and low battery regardless of the time of day.

Using the UP/DOWN Key

The UP/DOWN key, located on the right side of the display, is used to navigate through the various display and to change values or parameters that can be set by the user.

Using the SET Key

The SET key, located in the center under the display, is used to initiate change of values that can be changed or selected by the user: Local Time and the beginning and end of Quiet Time are examples. When the time is displayed and the SET key is pressed the time will begin to flash and the digit which may be changed is underlined. The UP/DOWN key is used to change the value. Change the Hours digit first, wait for the underline to move to the right, tens of minutes position, and set it, wait again for the underline to move to the minutes position, and then set the minutes digit last. Press ENTER to store the new value. If the UP/DOWN key is held the display will scroll.

Using the ENTER Key

The ENTER key is used to store a value that has been changed. The ENTER key is also used to ENTER the SETUP & INFO DISPLAYS. The ENTER key can also be requested by a display to exit, or to acknowledge a test.

The controller allows an RV TYPE (COACH or TRAILER) to be setup. The RV TYPE controls the way the safety feature operates. For both types the generator mode is forced to MANUAL when a Start Inhibit Input is first detected. This prevents automatic starting if the vehicle or trailer has just been parked in a garage. The COACH type allows automatic modes after the vehicle has been parked. The table below summarizes operation:

| RV TYPE | ACTION | MODE |
| --- | --- | --- |
| COACH (Default) | Safety Brake Set | ANY |
| | Safety Brake Off | ANY |
| | Safety Brake Reset | Goes to MANUAL |
| TRAILER | Brakes Off | ANY |
| | Brakes Applied | Goes to MANUAL |

Setting the RV TYPE

From the default display press the UP key for the SETUP & INFO display and press ENTER. Use the UP/DOWN key to navigate to the AUTO START display and press ENTER. Navigate to the SAFETY RV TYPE display and press SET. The display will flash and the type of RV will be displayed. The default is COACH<. The character < is used to indicate all default displays. Use UP/DOWN to select the appropriate RV TYPE. Press ENTER. The new type is stored in permanent memory. This will not have to be setup again unless the controller is installed on a different RV TYPE at a later date.

Setting the GEN TYPE

The controller memory stores parameters for many different generators, and the user may select from among the stored generators to indicate the one to which the controller is connected. The controller is set to a default GEN TYPE, and can be changed to accommodate different generators. The GEN TYPE sets the Service Interval for service messages and critical automatic starting parameters. The following table lists a selection of preferred generator types having parameters that are stored in the controller memory:

| GEN TYPE | MODEL | Service In |
| --- | --- | --- |
| QD 7.5/8 (Default) | Quiet Diesel 7.5-8 kW | 100 hours |
| QD 5.5 | Quiet Diesel 5.5 kW | 50 hours |
| GAS/LP | Emerald, Marquis, Microlite, Micro Quiet, Camp Power | 150 hours |
| QD 10/12 | Quiet Diesel 10/12 kW | 250 hours |

To change the GEN TYPE navigate to the SETUP & INFO display and press ENTER. Now navigate to the GENSET display and press ENTER. The GEN TYPE will be displayed. Press SET, the display will flash. Use the UP/DOWN key to select the GEN TYPE and press ENTER when the appropriate type is displayed. The type is stored in permanent memory and will not have to be changed unless the EGR-1 is installed on a different type genset.

Setting the Hour-Meter

If the controller is installed on a new genset this step may be skipped. If the controller is installed on an existing genset, check the hour-meter on the genset and record the reading. ENTER the SETUP & INFO menu and navigate to the GENSET display. Press ENTER and use the DOWN key to select the SET Gen hours display. Press SET. The next displays says, ENTER to unlock. This prevents unauthorized changes to the hour-meter. Press ENTER to continue. The displays will flash and UP/DOWN key can be used to change the value. Note that the digit to be changed is indicated by an underline. Waiting about four seconds allows the underline to move to the right one digit. When the correct genset hours are displayed press ENTER. The value is stored in permanent memory and will not have to be changed unless the controller is installed on a different genset.

Setting Local Time

The default display after power up is the Local Time and the Generator Mode. The Local Time is used to prohibit automatically starting the genset during Quiet Time. To set the local time simply press the SET key and use the UP/DOWN key to change the time. Note that the display flashes and the hour digit is underlined. Set the hour value, wait about four seconds for the underline to move to the right, set the tens digit, and then wait again to set the minutes digit. This method makes changing the time when crossing a time zone easy and quick. Simply adjust the hour and press ENTER.

Setting Quite Time Start and End

The controller QUIET ON generator mode prohibits the generator from automatically starting between the start and end of Quiet Time. To change these times use the UP/DOWN key to navigate to the QT START or QT END display. The current setting is shown. Press SET to change the setting. Use the UP/DOWN key to change the setting and press ENTER to store it in permanent memory.

Using the Battery Displays

The battery level indicator and battery voltage should be wired to the domestic battery. The battery level indicator uses both short and long term voltage trends to determine the battery level. It is intended as a guide to the state-of-charge (SOC) of the battery and its ability to sustain the load. When in the automatic modes it also serves as the default trigger points for starting and stopping the genset to charge a low battery. The genset is started when the bar graph only shows one segment and stopped when three bars are displayed.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A generator controller for controlling the operation of an internal combustion engine driven generator configured to generate and deliver electrical current to charge a battery, the generator controller comprising:

a processor;

an input capable of receiving an indication of a battery voltage;

an output capable of sending signals to the generator configured to charge the battery;

a real-time clock in signal communication with the processor, the real-time clock being configured to track time of day local to the generator; and a memory accessible by the processor, the memory containing stored programming instructions operable by the processor to (1) determine a state of charge of the battery and (2) to cause the generator to automatically charge the battery or prevent the generator from charging the battery as a function of the battery state of charge and the local time of day.

2. The generator controller of claim 1, wherein the time of day comprises an adjustable quiet time during which the generator may not be run.

3. The generator controller of claim 2, wherein the programming instructions further cause the processor to determine the state of charge of the battery at an adjustable time in advance of the quiet time and to operate the generator to charge the battery if the state of charge is determined to be too low.

4. The generator controller of claim 3, wherein the determination of whether the state of charge is too low is based upon historical battery usage information stored in the memory.

5. The generator controller of claim 3, wherein the determination of whether the state of charge is too low is based upon an adjustable value stored in the memory.

6. The generator controller of claim 1, wherein the time of day comprises an adjustable period prior to an expected battery usage period.

7. The generator controller of claim 6, wherein the programming instructions further cause the processor to determine the state of charge of the battery at the time of day and to operate the generator to charge the battery if the state of charge is determined to be too low.

8. The generator controller of claim 7, wherein the determination of whether the state of charge is too low is based upon historical battery usage information stored in the memory.

9. The generator controller of claim 7, wherein the determination of whether the state of charge is too low is based upon an adjustable value stored in the memory.

10. The generator controller of claim 7, wherein the usage period comprises a morning.

11. The generator controller of claim 7, wherein the usage period comprises an evening.

* * * * *